(12) United States Patent
Hasegawa et al.

(10) Patent No.: US 11,339,976 B2
(45) Date of Patent: May 24, 2022

(54) HOT-WATER SUPPLY DEVICE

(71) Applicant: NORITZ CORPORATION, Hyogo (JP)

(72) Inventors: Takahide Hasegawa, Kakogawa (JP); Atsushi Ushio, Akashi (JP); Ryo Takahashi, Hyogo (JP)

(73) Assignee: NORITZ CORPORATION, Hyogo (JP)

( * ) Notice: Subject to any disclaimer, the term of this patent is extended or adjusted under 35 U.S.C. 154(b) by 0 days.

(21) Appl. No.: 16/655,245

(22) Filed: Oct. 17, 2019

(65) Prior Publication Data
US 2020/0132312 A1   Apr. 30, 2020

(30) Foreign Application Priority Data
Oct. 26, 2018 (JP) .............................. JP2018-201556

(51) Int. Cl.
   *F24D 19/10* (2006.01)
   *F24D 17/00* (2022.01)
   *F24H 1/12* (2022.01)

(52) U.S. Cl.
   CPC ..... *F24D 19/1051* (2013.01); *F24D 17/0078* (2013.01); *F24H 1/124* (2013.01); *F24D 2220/042* (2013.01); *F24D 2220/044* (2013.01)

(58) Field of Classification Search
   CPC ............. F24D 19/1051; F24D 17/0078; F24D 2220/044; F24D 19/1015; F24D 2220/042; F24H 9/2035; F24H 9/2007; F24H 1/0027; F24H 1/145; F24H 1/124; G05B 2219/23051; G05B 2219/23406; F16K 37/005

USPC ....................................................... 122/13.3
See application file for complete search history.

(56) References Cited

U.S. PATENT DOCUMENTS

| 4,522,333 A | * | 6/1985 | Blau, Jr | F24D 17/0078 236/20 R |
| 4,832,259 A | * | 5/1989 | Vandermeyden | F23N 1/082 236/20 R |
| 4,936,289 A | * | 6/1990 | Peterson | F24D 19/1054 122/13.3 |

(Continued)

FOREIGN PATENT DOCUMENTS

JP          2007017128      *  1/2007

*Primary Examiner* — Michael G Hoang
*Assistant Examiner* — Andrew W Cheung
(74) *Attorney, Agent, or Firm* — JCIPRNET

(57) ABSTRACT

A hot-water supply device includes a hot-water dispenser supplying hot-water, a hot-water supply path supplying the hot-water to a hot-water supply tap, a circulation path carrying out instant hot-water operation which circulates and heats the hot-water remaining in the hot-water supply path, a first clock repeatedly measuring unit times in which a pattern of hot-water usage of a user makes a round, and a flow rate sensor detecting the supply of the hot-water from the hot-water supply tap. The control portion detects, for each of the unit times and based on detection signals of the flow rate sensor, a time zone in which hot-water supply operation is carried out, and reserves, based on a time zone in a first unit time in which the hot-water supply operation is carried out, a time zone in a second unit time following the first unit time for carrying out the instant hot-water operation.

2 Claims, 10 Drawing Sheets

(56) References Cited

U.S. PATENT DOCUMENTS

| | | | | |
|---|---|---|---|---|
| 6,293,471 | B1* | 9/2001 | Stettin | F24H 9/2021 |
| | | | | 165/268 |
| 7,832,421 | B2* | 11/2010 | Laing | F24D 19/1051 |
| | | | | 137/337 |
| 9,702,591 | B2* | 7/2017 | Yamamoto | F24D 19/1054 |
| 2008/0006227 | A1* | 1/2008 | Ziehm | F24H 9/124 |
| | | | | 122/19.1 |
| 2010/0126604 | A1* | 5/2010 | Lund | F24D 17/0078 |
| | | | | 137/565.01 |
| 2012/0209439 | A1* | 8/2012 | Inoue | G06Q 10/04 |
| | | | | 700/291 |
| 2014/0074302 | A1* | 3/2014 | McNamara | G05D 7/0617 |
| | | | | 700/282 |
| 2014/0297048 | A1* | 10/2014 | Buchheit | H04L 12/282 |
| | | | | 700/283 |
| 2015/0148971 | A1* | 5/2015 | Acker | G05B 15/02 |
| | | | | 700/282 |
| 2017/0122575 | A1* | 5/2017 | Acker | F24D 19/1081 |

* cited by examiner

HOT-WATER SUPPLY DEVICE

CROSS-REFERENCE TO RELATED APPLICATION

This application claims the priority of Japan patent application serial no. 2018-201556, filed on Oct. 26, 2018. The entirety of the above-mentioned patent application is hereby incorporated by reference herein and made a part of this specification.

BACKGROUND

Technical Field

The disclosure relates to a hot-water supply device, more particularly, to a hot-water supply device which has an instant hot-water operation function of circulating and heating hot-water in a hot-water supply path.

Related Art

In Japanese Laid-Open No. 2007-17128 (patent literature 1), a hot-water supply device is disclosed which has an instant hot-water operation function for supplying, by circulating and heating hot-water in a hot-water supply path, the hot water at an appropriate temperature immediately after a tap is opened.

In patent literature 1, a hot-water supply control system is disclosed in which a sensor for detecting movement of a user at home is used to predict hot-water outlet from a water supply path and select execution/stop of heat insulation circulation operation, and thereby reducing energy consumption of the heat insulation circulation operation. In patent literature 1, for example, a case is disclosed in which when human movement in a space near the water supply path is detected, it is determined that the human has woken up and control of preparing hot water in advance is started.

However, in the above configuration, the sensor for detecting the movement of the user at home and a communication component for communicating detection values of the sensor to a controller of a hot-water dispenser are required to be installed. Furthermore, the movement detected by the sensor may also be executed even when the hot-water dispenser is not required to be used. For example, there are cases in which the user simply passes by the space near the water supply path for movement. In addition, there is a risk that when the user wants to use hot-water immediately after the movement is detected in the sensor, the instant hot-water operation is not yet sufficient, and low-temperature water is provided.

SUMMARY

A hot-water supply device according to an aspect of the disclosure includes a hot-water dispenser, a hot-water supply path, a circulation path, a control portion, a first clock, and a flow rate sensor. The hot-water dispenser is used for supplying hot-water. The hot-water supply path is used for supplying the hot-water from the hot-water dispenser to a hot-water supply tap. The circulation path is used for carrying out instant hot-water operation which circulates and heats the hot-water remaining in the hot-water supply path. The control portion controls hot-water supply operation and the instant hot-water operation of the hot-water dispenser. The first clock can repeatedly measure unit times which are times in which a pattern of hot-water usage of a user makes a round. The flow rate sensor detects the supply of the hot-water from the hot-water supply tap. The control portion is configured to detect, for each of the unit times and based on detection signals of the flow rate sensor, a time zone in which the hot-water supply operation is carried out. The control portion is further configured to reserve, based on a time zone which is detected in a first unit time and in which the hot-water supply operation is carried out, a time zone in a second unit time following the first unit time in which the instant hot-water operation is carried out, and carry out the instant hot-water operation based on the reservation in the second unit time.

DESCRIPTION OF THE EMBODIMENTS

Figure 1:
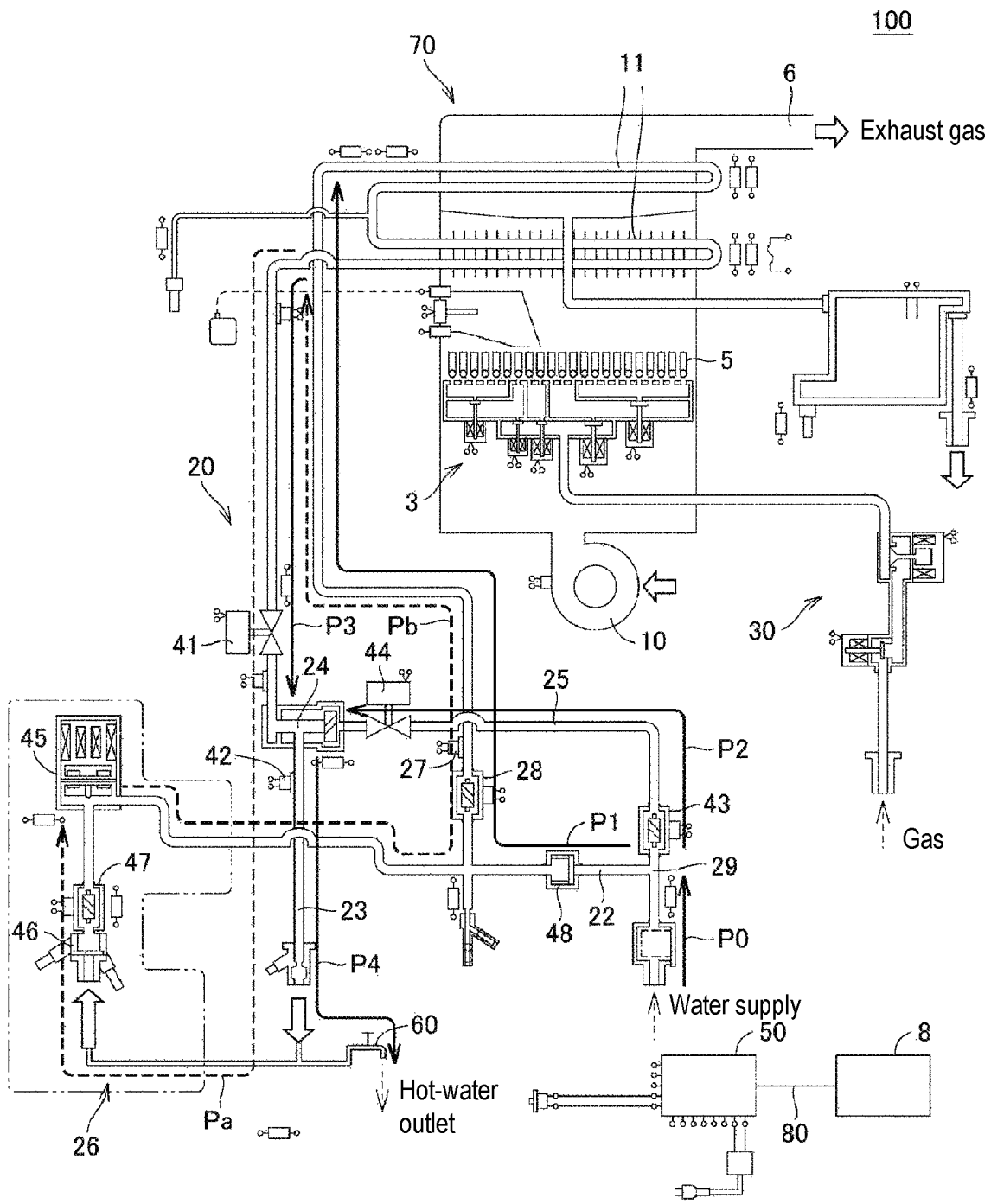
FIG. 1 is a diagram showing a schematic configuration of a hot-water supply device according to an embodiment of the disclosure.

The disclosure provides a hot-water supply device which achieves both energy saving and user comfort.

According to the hot-water supply device, the control portion can automatically reserve the time zone of the instant hot-water operation based on the time zone in which the hot-water supply operation is carried out, and the control portion can carry out the instant hot-water operation in the reserved time zone. Therefore, the time zone of the instant hot-water operation can be automatically reserved without requiring setting of the instant hot-water operation using a remote controller or the like by the user. In addition, the time zone of the instant hot-water operation is reserved based on a time zone in which the user uses the hot-water actually, and thus the instant hot-water operation can be carried out at a timing in accordance with the movement of the user.

According to the disclosure, the hot-water supply device which achieves both energy saving and user comfort can be provided.

An embodiment of the disclosure is specifically described with reference to drawings. Furthermore, in the following, the same or corresponding parts in the drawings are denoted by the same symbols, and the description thereof will not be repeated in principle.

Embodiment

FIG. 1 is a configuration diagram of a hot-water supply device according to the embodiment.

With reference to FIG. 1, a hot-water supply device 100 includes a hot-water dispenser 70, a flowing water system 20, a fuel system 30, a controller 50, and a remote controller 8. The hot-water supply device 100 has an instant hot-water function for supplying, by circulating and heating hot-water in the hot-water supply path, the hot water at an appropriate temperature immediately after a tap is opened.

The hot-water dispenser 70 combusts fuel gas and supplies hot-water (high temperature water). The hot-water dispenser 70 includes a combustion portion 3, a heat exchange portion 11, a blower 10, and an exhaust portion 6. The combustion portion 3 is connected with the fuel system 30 and combusts the fuel gas supplied from the fuel system 30. The heat exchange portion 11 recovers thermal energy of the combustion gas generated by the combustion in the combustion portion 3 and heats the flowing hot-water. The blower 10 supplies air to the combustion portion 3. The exhaust portion 6 exhausts the combustion gas passing through the heat exchange portion 11 to the outside.

The flowing water system 20 includes pipes through which the hot-water flows. The flowing water system 20 has an inflow side pipe 22, an outflow side pipe 23, a bypass pipe 25, and a hot-water supply return pipe 26. The inflow side pipe 22 is a pipe for introducing low-temperature water supplied from a water supply source not shown to the heat exchange portion 11. When a hot-water supply tap 60 is opened, the low-temperature water is supplied to the inflow side pipe 22 by water pressure of the water supply source.

The outflow side pipe 23 is a pipe for supplying high temperature water heated by heat exchange with the combustion gas in the heat exchange portion 11 to the hot-water supply tap 60 or a bathtub not shown. The bypass pipe 25 is arranged between the inflow side pipe 22 and the outflow side pipe 23. The bypass pipe 25 is arranged to bypass the heat exchange portion 11 and supply the hot-water of the inflow side pipe 22 to the outflow side pipe 23. In the bypass pipe 25, a water supply side flow rate sensor 43 for detecting a flow rate of the hot-water and a bypass flow rate regulating valve 44 are arranged. An opening degree of the bypass flow rate regulating valve 44 is controlled by the controller 50. By the control of the opening degree of the bypass flow rate regulating valve 44, a ratio of the flow rate of the bypass pipe 25 to a flow rate of the heat exchange portion 11 can be controlled.

In the inflow side pipe 22, a water inlet temperature sensor 27, a hot-water side flow rate sensor 28, and a check valve 48 are arranged. The hot-water side flow rate sensor 28 detects a flow rate of warm water introduced into the heat exchange portion 11. The water inlet temperature sensor 27 detects a temperature of the hot-water introduced into the heat exchange portion 11 (hereinafter, also called "water inlet temperature"). Furthermore, the hot-water side flow rate sensor 28 and the water inlet temperature sensor 27 are disposed closer to a downstream side in a flowing direction of the hot-water than a connection portion 29 of the bypass pipe 25 in the inflow side pipe 22. Detection values obtained by the water inlet temperature sensor 27 and the hot-water side flow rate sensor 28 are input to the controller 50. The check valve 48 is arranged for flowing the hot-water in only one direction.

In the outflow side pipe 23, a flow rate regulating valve 41 is disposed closer to an upstream side in the flowing direction of the hot-water than a connection portion 24 of the bypass pipe 25. Furthermore, a hot-water outlet temperature sensor 42 is disposed closer to the downstream side in the flowing direction of the hot-water than the connection portion 24. The hot-water outlet temperature sensor 42 detects a temperature (hereinafter, also called hot-water temperature) Tw of the hot-water flowing through the outflow side pipe 23. The hot-water temperature Tw is a temperature of hot-water coming out of the hot-water supply tap 60 during the hot-water supply operation and is a temperature of hot-water circulating a circulation path described later during the instant hot-water operation. The hot-water temperature Tw is input from the hot-water outlet temperature sensor 42 to the controller 50. An opening degree of the flow rate regulating valve 41 is controlled by the controller 50.

The controller 50 is typically configured by a microcomputer and controls actions of the hot-water supply device 100 including the hot-water supply operation and the instant hot-water operation which are described later. The controller 50 controls actions of each machine using inputs of various sensors so as to make the hot-water supply device 100 act according to operation instructions input to the remote controller 8. The controller 50 corresponds to one example of a "control portion".

The hot-water supply device 100 further includes, as configurations for the instant hot-water operation, a circulation pump 45, a circulation flow rate sensor 47 and a check valve 46 together with the hot-water supply return pipe 26. The hot-water supply return pipe 26 connects the outflow side pipe 23 and the inflow side pipe 22. In the hot-water supply return pipe 26, the circulation pump 45 for circulating the hot-water, the circulation flow rate sensor 47 for detecting a flow rate of warm water introduced into the circulation pump 45, and the check valve 46 for flowing the hot-water in only one direction are arranged. The circulation pump 45 supplies the hot-water using a motor not shown as a driving source, and can be configured by, for example, a known spiral pump.

The hot-water supply device 100 of the embodiment is a hot-water supply device with a built-in circulation pump, and can suck the hot-water of the outflow side pipe 23 and discharge the hot-water to a side of the inflow side pipe 22 by an operation of the circulation pump 45. As a result, even if the hot-water supply tap 60 is closed, a circulating heating path (hereinafter, also called "circulation path") which passes through the heat exchange portion 11 can be formed inside the hot-water supply device 100 by circulating the hot-water heated by the heat exchange portion 11 from the outflow side pipe 23 to the inflow side pipe 22. At this time, by the check valve 46, during the operation of the circulation pump 45, a back flow from the side of the inflow side pipe 22 to a side of the outflow side pipe 23 can be prevented, and the circulation path can be formed.

Next, the actions of the hot-water supply device 100 are described. The hot-water supply device 100 includes normal hot-water supply operation for starting combustion in response to a hot-water outlet request and the instant hot-water operation for generating hot-water at a set temperature in advance before the hot-water outlet request.

The normal hot-water supply operation of the hot-water supply device 100 is described below. The hot-water supply operation is an operation for supplying the hot-water from the hot-water dispenser 70 to the hot-water supply tap 60. When the hot-water supply tap 60 is opened, a path P0 is formed through which the hot-water (the low-temperature water) flows into the inflow side pipe 22 due to the water pressure of the water supply source (not shown). The low-temperature water inflowing by the path P0 is branched into a path P1 through which the low-temperature water is input to the heat exchange portion 11 by the inflow side pipe 22 and a path P2 through which the low-temperature water is output without being heated to the outflow side pipe 23 passing through the bypass pipe 25. As described above, a flow rate ratio of the paths P1 and P2 is controlled by the opening degree regulation of the bypass flow rate regulating valve 44 performed by the controller 50.

The hot-water (the low-temperature water) which is input to the heat exchange portion 11 by the path P1 is heated by the heat exchange portion 11. The hot-water (high temperature water) which was heated by the heat exchange portion 11 is output to the outflow side pipe 23 by a path P3. In the outflow side pipe 23, the low-temperature water of the path P2 and the high temperature water of the path P3 are mixed in the connection portion 24 with the bypass pipe 25 and then supplied to the hot-water supply tap 60 by a path P4. That is, the paths P3 and P4 in FIG. 1 form a "hot-water supply path" for supplying the hot-water from the hot-water dispenser 70 to the hot-water supply tap 60.

Furthermore, when the instant hot-water operation is stopped, the circulation pump 45 is stopped, and thus the hot-water of the path P4 is not introduced into the hot-water supply return pipe 26. Furthermore, due to the arrangement of the check valve 46, flow of the hot-water is not generated in a direction from the side of the inflow side pipe 22 to the side of the hot-water supply return pipe 26, either.

Next, the instant hot-water operation of the hot-water supply device 100 is described. The instant hot-water operation is an operation for circulating and heating the hot-water remaining in the hot-water supply path. When the instant hot-water operation is started, the controller 50 activates the circulation pump 45, thereby forming a path Pa through which the hot-water from the heat exchange portion 11 is sucked to the circulation pump 45 through the outflow side pipe 23 and a path Pb through which the hot-water discharged from the circulation pump 45 is introduced to the heat exchange portion 11 through the inflow side pipe 22. Furthermore, when the instant hot-water operation is stopped, the controller 50 can detect, based on the detection value of the water supply side flow rate sensor 43 and/or the hot-water side flow rate sensor 28, that the hot-water supply operation is carried out.

Furthermore, the controller 50 executes combustion operation performed by the hot-water dispenser 70 until a temperature of the hot-water flowing through the hot-water supply return pipe 26, for example, the hot-water temperature Tw detected by the hot-water outlet temperature sensor 42 reaches a target temperature of the instant hot-water operation. The target temperature is set to a value equal to or close to the hot-water supply set temperature. Besides, if the hot-water outlet temperature reaches the target temperature, the circulation pump 45 and the combustion operation are stopped and thereby the instant hot-water operation is finished. That is, the paths Pa and Pb in FIG. 1 form a "circulation path" for carrying out the instant hot-water operation for circulating and heating the hot-water remaining in the hot-water supply path. Furthermore, in the instant hot-water operation, the controller 50 can confirm, from the detection value of the circulation flow rate sensor 47, that the hot-water flows through the hot-water supply return pipe 26, that is, the instant hot-water operation is carried out.

In the instant hot-water operation, when the hot-water supply tap 60 is closed, the hot-water circulates in the "circulation path" consisting of the paths Pa and Pb, and thus the flow rate detected by the hot-water side flow rate sensor 28 and the flow rate detected by the circulation flow rate sensor 47 are the same.

On the other hand, when the hot-water supply tap 60 is opened in the instant hot-water operation, one portion of the low-temperature water supplied from the path P0 further flows into the inflow side pipe 22, and thus the flow rate detected by the hot-water side flow rate sensor 28 increases. An increase amount of the hot-water flowing in the outflow side pipe 23 is the same as the hot-water supplied from the hot-water supply tap 60, and thus the flow rate detected by the circulation flow rate sensor 47 does not change. Therefore, when the hot-water supply tap 60 is opened in the instant hot-water operation, the detection value of the hot-water side flow rate sensor 28 is greater than the detection value of the circulation flow rate sensor 47.

The controller 50 detects the supply of the hot-water from the hot-water supply tap 60 from a difference between the detection values of the hot-water side flow rate sensor 28 and the circulation flow rate sensor 47. The hot-water side flow rate sensor 28 and the circulation flow rate sensor 47 correspond to one example of a "flow rate sensor". Furthermore, due to the arrangement of the check valve 48, flow of the hot-water from the circulation path to the paths P0, P2 of the water supply side is not generated.

Figure 2:
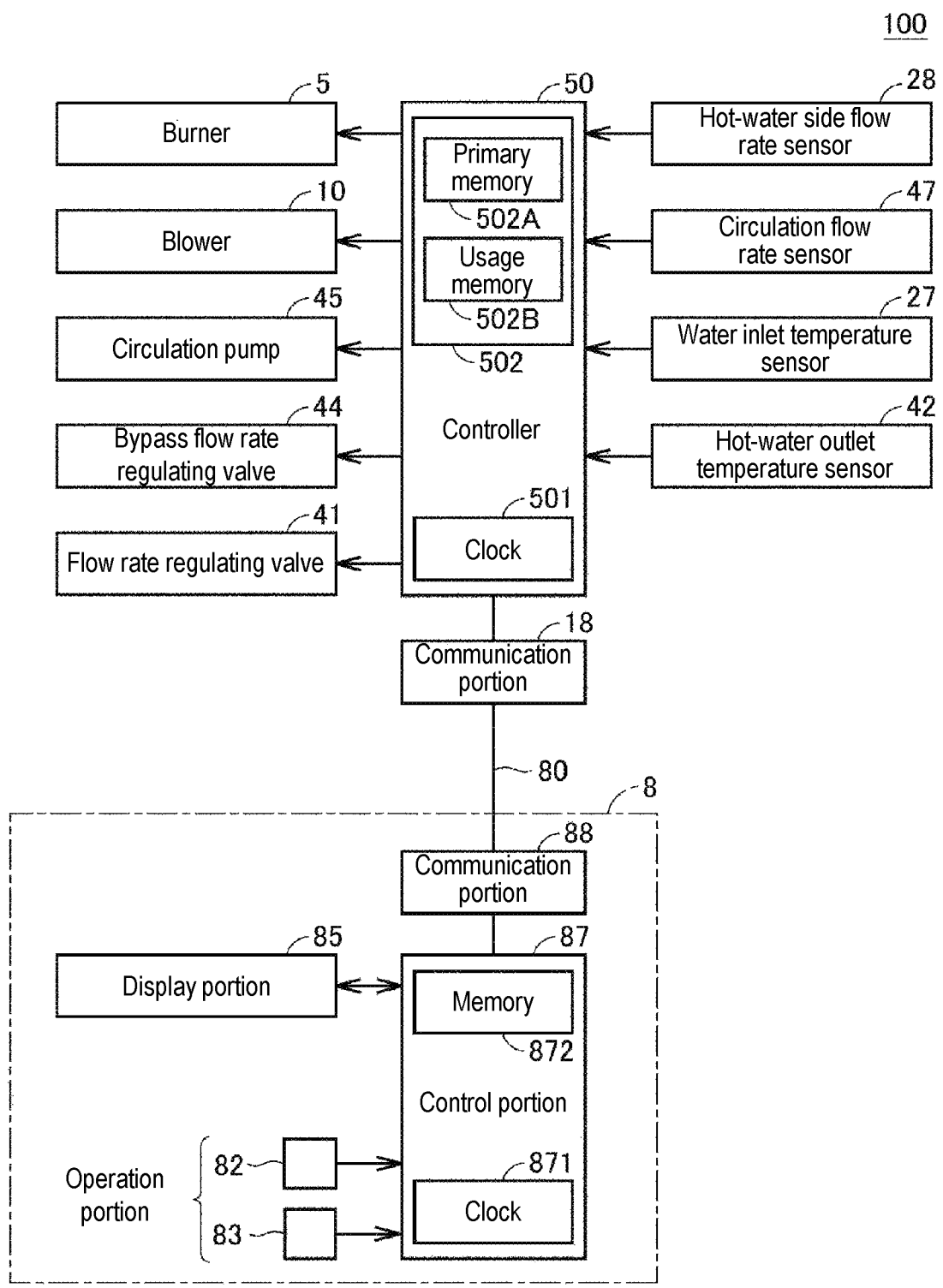
FIG. 2 is a function block diagram for illustrating a control configuration of the hot-water supply device according to the embodiment.

FIG. 2 is a function block diagram for illustrating a control configuration of the hot-water supply device 100 according to the embodiment.

With reference to FIG. 2, the controller 50 control the actions of the hot-water supply device 100. The controller 50 receives the detection values of the hot-water side flow rate sensor 28, the circulation flow rate sensor 47, the water inlet temperature sensor 27 and the hot-water outlet temperature sensor 42. The controller 50 controls, based on the received detection values of various sensors, a burner 5, the blower 10, the circulation pump 45, the bypass flow rate regulating valve 44 and the flow rate regulating valve 41.

The controller 50 is configured by a microcomputer and incorporates a CPU (Central Processing Unit) and an input/output interface which are not shown, a clock 501 and a memory 502.

The clock 501 repeatedly measures unit times. In the specification, the "unit times" are times in which a pattern of hot-water usage of a user makes a round, for example, at least one of one day, one week, one month and one year. This is because it is assumed that the same action is repeated basically every 24 hours, for example, the user washes face every morning and takes a bath every night. Therefore, if the unit time of the clock 501 is one day, reservation can be carried out in a manner that the instant hot-water operation is performed in the same time zone every day on the basis of the unit time of the clock 501. Furthermore, it is also assumed that the same action is repeated every week, for example, the user goes home late and takes a bath around 9 o'clock at night on weekdays (Monday to Friday), but takes a bath early around 7 o'clock at night on Saturday and Sunday. Similarly, it is also assumed that the same action is repeated in one month and one year. The clock 501 corresponds to one example of a "first clock".

The clock 501 can be configured by a real-time clock built-in the microcomputer. The real-time clock is powered from an auxiliary power supply, and thus an actual time can be reflected even if a power supply is cut off. In addition, the clock 501 may be linked to a GPS (Global Positioning System) so that a time difference or a summer time can be reflected in the time of the clock 501.

The memory 502 is configured to be capable of keeping information input to the controller 50 and using the kept information in the controller 50 or outputting the kept information from the controller 50. The memory 502 is configured by, for example, a volatile memory and a non-volatile memory. The memory 502 includes a primary memory 502A and a usage memory 502B.

A communication portion 18 has a communication function using a communication line 80. The remote controller 8 is used for remotely operating each portion of the hot-water supply device 100 including the hot-water dispenser 70. The remote controller 8 has an operation switch 82 and an operation switch 83, a display portion 85, a control portion 87, and a communication portion 88. Typically, the operation switch 82 and the operation switch 83 can be configured by a push button or a touch button. Typically, the display portion 85 can be configured by a liquid crystal panel and may be configured as a touch panel which can be operated by touching a screen.

The control portion 87 is configured by a microcomputer and incorporates a CPU (Central Processing Unit) and an input/output interface which are not shown, a memory 872 and a clock 871. The memory 872 is configured to be capable of keeping information input into the control portion 87 and outputting the kept information from the control portion 87. The memory 872 is configured by, for example, a non-volatile memory. The clock 871 is included for measuring the current time.

The communication portion 88 is connected to the hot-water supply device 100 via the communication line 80. The hot-water supply device 100 and the remote controller 8 can communicate with one another bi-directionally using the communication portions 18, 88 and the communication line 80.

In a conventional hot-water supply device, in order to effectively carry out instant hot-water operation, the user needs to specify, in view of time zones in which the user uses the hot-water supplied from the hot-water supply tap 60 by hot-water supply operation, time zones in which the instant hot-water operation is to be carried out. In the following description, using the hot-water supplied from the hot-water supply tap 60 is also called using hot-water or simply called hot-water usage. Specifically, for example, the user needs to carry out, on a screen of a remote controller, operations of setting reservation of time zones in which the instant hot-water operation is required and cancelling reservation of time zones not wanted, and there is concern of wasting time of the user. Furthermore, this manual reservation of the instant hot-water operation by the user requires to be re-reserved each time according to lifestyle, family structure and seasonal changes of the user, and there is concern of bringing inconvenience to the user.

On the other hand, in patent literature 1, a hot-water supply control system is disclosed in which a sensor for detecting movement of the user which is considered to relate to hot-water outlet is installed at home, and heat insulation circulation operation is turned on/off based on detection values of the sensor. However, in this configuration, there is possibility that the movement detected by the sensor may include movement which actually does not relate to the hot-water usage, and there is a risk that because the hot-water supply control system mistakenly turns on/off the heat insulation circulation operation, user comfort is impaired or energy consumption is wasted.

The hot-water supply device 100 according to the embodiment of the application is configured to automatically detect the time zones in which the user uses the hot-water supply, reserve the instant hot-water operation based on the time zones, and execute the instant hot-water operation according to the reservation.

Specifically, in the hot-water supply device 100, during both the execution and stop of the instant hot-water operation, the controller 50 detects the usage of the hot-water supply based on the detection values of three flow rate sensors. Furthermore, the controller 50 stores, in the primary memory 502A, the time zones in which the usage of the hot-water supply is detected. In addition, the controller 50 sets, based on the storage of the time zones in which the usage of the hot-water supply is detected (hereinafter, also called hot-water supply storage), time zones in which the instant hot-water operation is reserved, and stores the reservation of the instant hot-water operation (hereinafter, also called instant hot-water reservation) in the usage memory 502B. Furthermore, the controller 50 carries out the instant hot-water operation based on the instant hot-water reservation. Furthermore, the controller 50 can detect, based on differences of the detection values of a plurality of flow rate sensors, the usage of the hot-water supply during the execution of the instant hot-water operation (during forming of the circulation path), and thus maintain a function of reserving the time zones in which the instant hot-water operation is performed based on the hot-water supply storage even during the execution of the instant hot-water operation.

Accordingly, in the time zones in which the user uses the hot-water supply on a daily basis, the instant hot-water operation is reserved automatically, and the instant hot-water operation is executed according to the instant hot-water reservation, and thus the user comfort is improved. Conversely, in the time zones in which the user does not use the hot-water supply, the instant hot-water reserve is cancelled automatically, and thus unnecessary instant hot-water operation is prevented, and energy saving is improved. Therefore, the hot-water supply device 100 can achieve both user comfort and energy saving.

Figure 3:
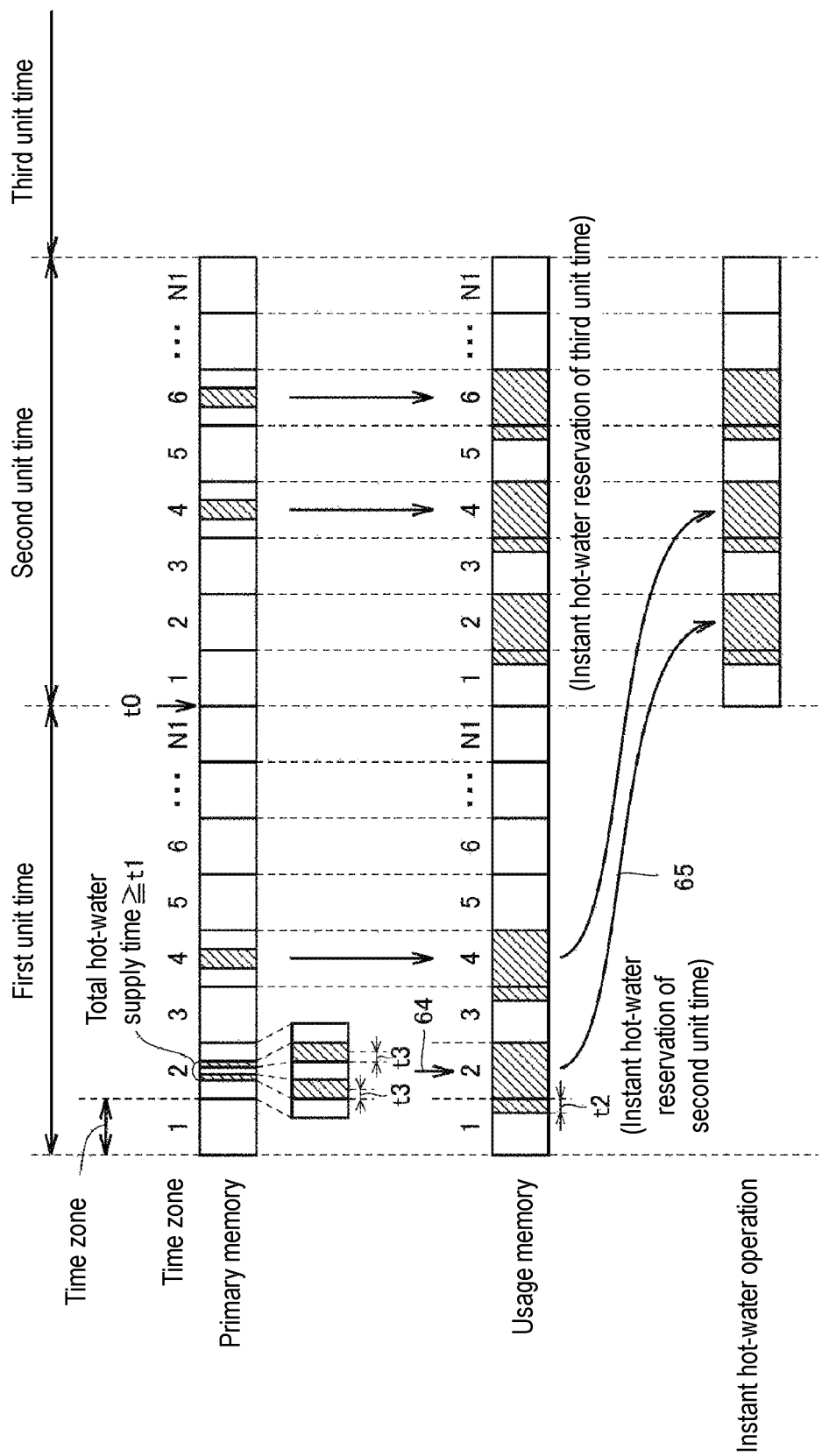
FIG. 3 is a diagram for illustrating setting of instant hot-water reservation based on hot-water supply storage in unit times (days).

FIG. 3 is a diagram illustrating setting of instant hot-water reservation based on hot-water supply storage in unit times (days). With reference to FIG. 3, the controller 50 includes the primary memory 502A and the usage memory 502B. In FIG. 3, the unit time is, for example, one day (24 hours). In FIG. 3, a first unit time and a second unit time are arbitrary consecutive unit times. The time zones are times set by dividing the unit times and have, for example, a length of 30 minutes or one hour. In each of time zones 1-N1 of the first and second unit times, times in which the hot-water supply is used are stored in the primary memory 502A. In addition, reservation time zones of the instant hot-water operation of the second and third unit times which are set based on the time zones in which the hot-water usage is detected are stored in the usage memory 502B. Details thereof are described below.

The controller 50 detects, for each unit time, based on detection signals of the water supply side flow rate sensor 43, the hot-water side flow rate sensor 28 and the circulation flow rate sensor 47, the time zones in which the hot-water supply operation is carried out.

Specifically, the controller 50 calculates, on the basis of the time of the clock 501, the times (hot-water supply times) in which the hot-water supply operation is detected. Besides, the controller 50 determines that the hot-water supply is used when the hot-water supply operation has continued for a predefined time t3 or longer, and stores the hot-water supply times in the primary memory 502A. Hereinafter, the predefined time t3 is also called a "determination time". By setting the determination time for determining the hot-water usage in this way, short-time usage of the hot-water (for example, when washing hands for a short time), in which the need for hot water is not so high for the user, may not be reflected in the primary memory 502A, and as a result, the short-time usage of the hot-water instant may not be reflected in the reservation of the hot-water operation, either. In this way, the instant hot-water operation can be carried out only corresponding to a case in which the need for hot water is high for the user, that is, the hot-water is used for a certain time or longer (for example, one shower), and thus the user comfort can be ensured, and the energy consumption can be suppressed.

The controller 50 further calculates a "total hot-water supply time" obtained by adding the hot-water supply times stored in the primary memory 502A for each time zone. The controller 50 determines that, when the total hot-water supply time is equal to or greater than a first reference value t1 in a certain time zone, the hot-water supply operation is carried out in the time zone. The first reference value t1 is, for example three seconds to five minutes.

Next, the controller 50 reserves, based on the time zones in which the hot-water supply operation is carried out in the first unit time, time zones in which the instant hot-water operation is to be carried out in the second unit time. Specifically, the controller 50 reserves the instant hot-water operation by storing, in the usage memory 502B, the time zones of the second unit time which are the same as the time zones in which it is determined that the hot-water supply operation is carried out in the first unit time (see an arrow 64). Furthermore, the controller 50 controls, in the second unit time, each portion of the hot-water supply device 100 to carry out the instant hot-water operation based on the instant hot-water reservation (see an arrow 65). Therefore, in time zones (in FIG. 3, time zones 2 and 4; for example, a time zone of bathing) in which the user uses the hot-water supply for a relatively longer time, the instant hot-water operation is also automatically carried out the next day, and thus the user can immediately use hot-water at an appropriate temperature in the time zones.

In addition, the controller 50 reserves the instant hot-water operation in a manner that the instant hot-water operation is carried out from a moment earlier by a predefined time t2 than the time zones in the second unit time which are the same as the time zones in the first unit time in which it is determined that the hot-water supply operation is carried out (a preheat function). Hereinafter, the time t2 is also called the "preheat time". The preheat function can immediately provide hot-water at a preferable temperature even when the user uses the hot-water supply at the same time as or immediately after a start moment of the time zones in which the hot-water supply is used. The preheat time t2 corresponds to one example of a "first reference time". The preheat time t2 is, for example, 5-15 minutes.

In addition, even when the hot-water supply is not used in the time zones in which the instant hot-water operation is reserved in the second unit time, the controller 50 maintains the reservation of the instant hot-water operation of the time zones (for example, the time zone 2 in FIG. 3). This is a control in view of a case in which movement of using the hot-water supply is stopped only for a short term (for example, 1-3 days) due to circumstances of the user. In this short-term disuse of the hot-water supply, for example, a case in which bathing is not performed for one day due to the absence of the user is considered. In this case, it is considered that keeping a state in which the instant hot-water operation can also be performed the next day without cancelling the instant hot-water reservation is desirable for the user.

On the other hand, the controller 50 cancels the reservation of the instant hot-water operation if the disuse of the hot-water supply continues for predefined days or longer. This is because it is considered desirable to cancel the instant hot-water reserve when, for example, the hot-water supply is not used for a moderate or long term (for example, about three or four days) in the time zones in which the hot-water supply is used until now due to a change of a life pattern of the user. In this life pattern change, for example, a change is considered that the user takes a bath in the morning and evening in the hot season but quits the bath in the morning and only takes a bath in the evening when it gets cooler.

In order to cope with both the short-term disuse of the hot-water supply and the moderate or long-term change of the life pattern, a configuration in which the instant hot-water reserve is cancelled when it is confirmed that the hot-water supply is not used for several consecutive days in the time zones in which the hot-water supply is used until now is desirable. Specifically, when the total hot-water supply time in a certain time zone is less than a second reference value t4 in a plurality of consecutive unit times, it is stored in the usage memory 502B that the instant hot-water operation is not to be carried out in the same time zone in the next day. In other words, the instant hot-water reserve for the same time zone in the next day is cancelled. If configured in this way, in the instant hot-water reservation, the short-term movement change of the user is not reflected, and the moderate or-long-term life pattern change can be reflected.

Figure 4:
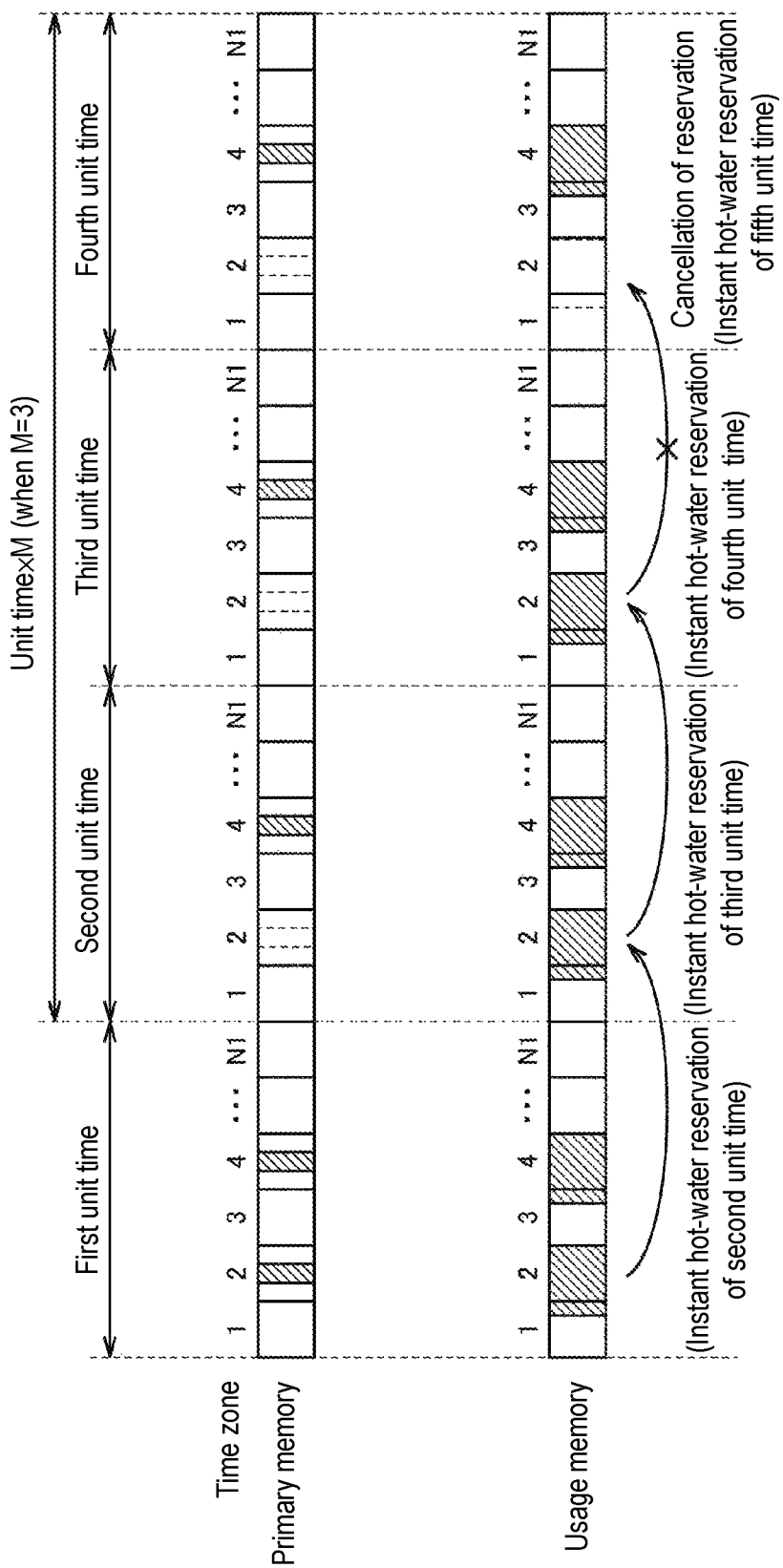
FIG. 4 is a diagram for illustrating cancellation of the instant hot-water reservation based on the hot-water supply storage in the unit times (days).

FIG. 4 is a diagram illustrating the cancellation of the instant hot-water reservation based on the hot-water supply storage in the unit times (days). Specifically, an example is shown in which reservation of the instant hot-water operation of a time zone is cancelled for the time zone (the time zone 2 in FIG. 4) in which the hot-water supply is used and the instant hot-water operation is reserved in the first unit time when the hot-water supply is not used in the same time zones of M consecutive unit times following other unit times. In FIG. 4, it is set that M=3.

With reference to FIG. 4, the hot-water supply is used in the time zone 2 of the first unit time, and thus the instant hot-water operation in the time zone 2 in the second unit time is reserved.

In the time zone 2 of the second unit time, the hot-water supply is not used. However, in the time zone 2 of the second unit time, the number of times the hot water supply is not used consecutively is one, and thus in the time zone 2 of the third unit time, the reservation of the instant hot-water operation is maintained.

In the time zone 2 of the third unit time, the hot-water supply is not used. However, in the time zone 2 of the third unit time, the number of times the hot water supply is not used consecutively is two, and thus the reservation of the instant hot-water operation in the time zone 2 of the fourth unit time is maintained.

In the time zone 2 of the fourth unit time, the hot-water supply is not used. In addition, in the time zone 2 of the fourth unit time, the number of times the hot water supply is not used consecutively is three. Therefore, the reservation of the instant hot-water operation in the time zone 2 of the fifth unit time is cancelled.

In other words, the controller 50 does not reserve the instant hot-water operation in the second time zone of the fifth unit time, when the total hot-water supply time of the second time zone in which the instant hot-water operation is reserved is less than the second reference value in consecutive M (in FIG. 4, three times) unit times before the fourth unit time and in the fourth unit time.

Furthermore, in the example of FIG. 4, a configuration in which when the hot-water supply is not used in the same time zone in the consecutive M unit times, the reservation of the instant hot-water operation of the time zone is cancelled is described, but the following configuration is also possible in which when the hot-water supply is not used in the same time zone in N or more unit times of the consecutive M unit times, the reservation of the instant hot-water operation of the time zone is cancelled. Here, N is an integer ranging from 2 to M.

The instant hot-water reservation which is shown in FIG. 3 and FIG. 4 and based on the time of the hot-water usage is carried out for the predefined number of times in the unit times. For example, in FIG. 5, a configuration in which the instant hot-water operation of the second unit time is reserved based on storage of the hot-water usage of the first unit time for a predetermined moment (a reservation determining moment t0, for example, 0 a.m.) once a day is illustrated. The reservation determining moment t0 may be set to a moment at which the unit time is switched (see FIG. 3). Timing at which the instant hot-water operation is reserved is not limited to the above example and may be configured, for example, in a manner that the instant hot-water operation is reserved at any time according to determination of the hot-water usage.

In addition, here, the hot-water supply time in each time zone is set as an amount serving as a reference for setting the reservation of the instant hot-water operation, but the disclosure is not limited hereto. The controller 50 may detect at least one of supply time, the number of times of supply and supply volume of the hot-water from the hot-water supply path for each time zone, and detect a time zone in which at least one of the supply time, the number of times of supply and the supply volume is equal to or greater than a corresponding first reference value t1 as a time zone in which the hot-water supply operation is carried out.

Similarly, the hot-water supply time in each time zone is set as an amount serving as a reference for cancelling the reservation of the instant hot-water operation, but the disclosure is not limited hereto. The controller 50 may detect at least one of the supply time, the number of times of supply and the supply volume of the hot-water from the hot-water supply path for each time zone, and does not reserve the instant hot-water operation in the second time zone of the second unit time when at least one of the supply time, the number of times of supply and the supply volume of the hot-water in the second time zone in which the instant hot-water operation is reserved is less than a corresponding second reference value in a plurality of consecutive unit times before the first unit time.

The preheat time t2 can be set based on at least one of environmental condition and installation condition of the hot-water supply device. The preheat time t2 may change length by learning. Specifically, a time from the start of the instant hot-water operation to the time when a temperature of the hot-water outlet temperature sensor 42 reaches a set temperature is measured, and the measured value is reflected in the value of the preheat time t2. For example, when an installation place of the hot-water supply device 100 is a cold land, or when a pipe length and a pipe thickness of the circulation path are great, the time from the start of the instant hot-water operation to the time when the set temperature is reached becomes longer, and thus the preheat time t2 also becomes longer. By regulating the preheat time t2, the hot-water at an appropriate temperature can be supplied even if the user uses hot water immediately after the start of the time zones in which the instant hot-water operation is reserved. In addition, it is considered that the time from the start of the instant hot-water operation to the time when the set temperature is reached also changes with season (particularly temperature condition), and thus the preheat time t2 can be automatically changed corresponding to the change in season (for example, once per month).

In addition, the determination time t3 may be variable and the user can regulate strength of reflecting the usage of the hot-water supply of the user in the reservation of the instant hot-water operation. In this way, the user can enjoy the instant hot-water operation matching usage situation and/or preference of hot-water supply of himself. For example, if usage of the hot-water supply in less than one second is very often and these cases are to be ignored, the determination time t3 may set to one second. In addition, the determination time t3 may be shortened if emphasis is put on the comfort of producing hot water at an appropriate temperature each time rather than saving energy consumption.

When the hot-water supply device 100 is shipped from the factory, instant hot-water reservation in a predefined pattern may be pre-set in the controller 50. In this case, at the time of construction of the hot-water supply device 100, it is possible that whether to use the pre-set instant hot-water reservation pattern or to turn on 24-hour instant hot-water reservation can be selected.

As described above, in the hot-water supply device 100 according to the embodiment, the controller 50 automatically detects the time zones in one day in which the hot-water supply is used and reflects the time zones in the reservation of the instant hot-water operation of the next day. Therefore, in the hot-water supply device 100, even if the user does not manually carry out the instant hot-water reservation, the instant hot-water operation matching the usage situation of the user can be achieved.

In addition, by setting the determination time t3 for determining the usage of the hot-water supply times, strength to reflect the hot-water usage in the instant hot-water reservation can be regulated. Accordingly, the user can select whether to save the energy consumption or to give priority to the comfort of immediately producing the hot-water at an appropriate temperature.

Furthermore, the embodiment can be applied not only to a case that the hot-water supply device 100 is installed alone as shown in FIG. 1, but also to a hot-water dispenser which is connected and installed. At this time, the learning of the instant hot-water operation can be shared among controllers of each hot-water dispenser.

Control for executing the instant hot-water operation on the basis of the hot-water supply time zones is described below using the flowcharts of FIGS. 5-9.

Figure 5:
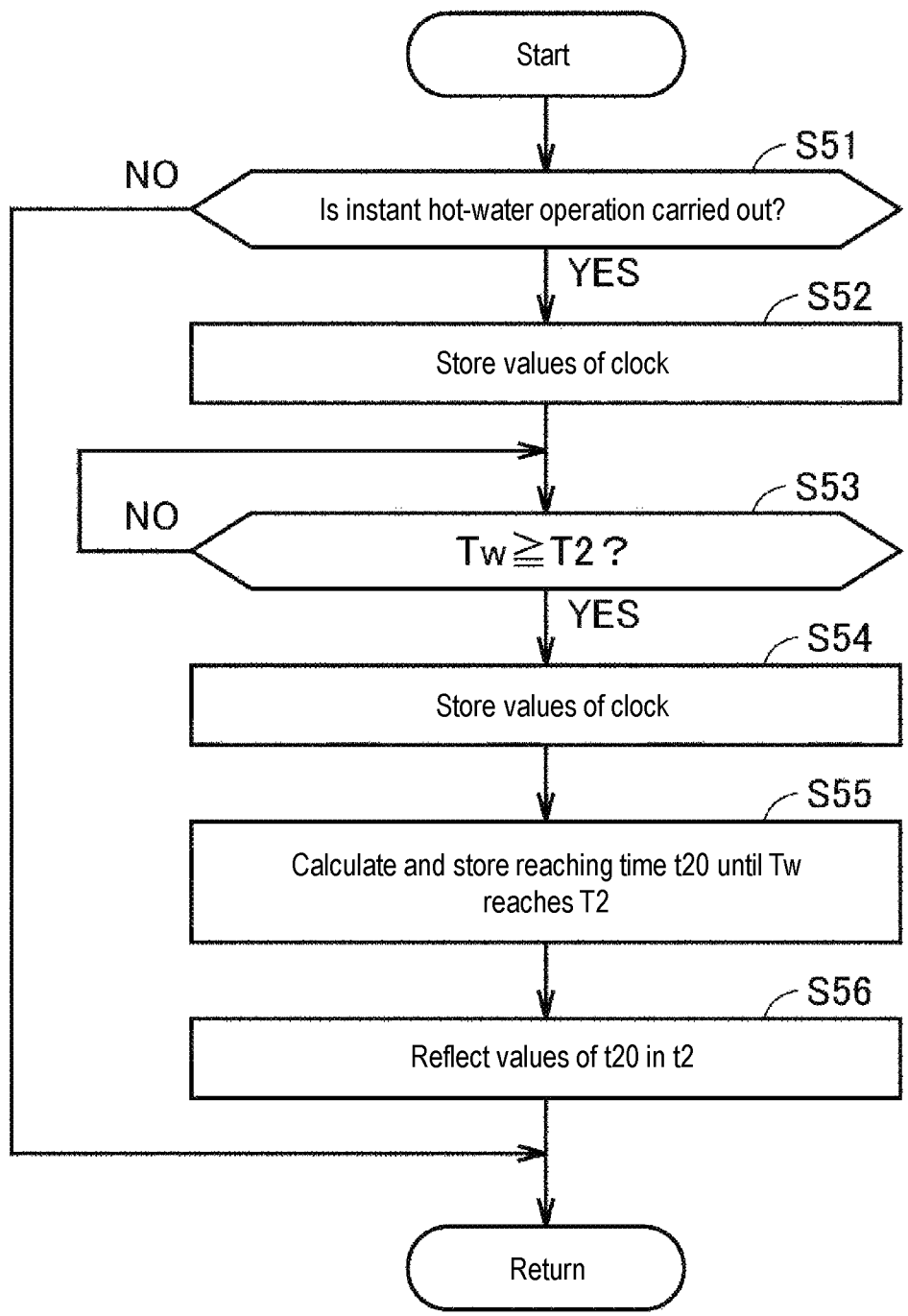
FIG. 5 is a flowchart for illustrating a setting method of a preheat time.

FIG. 5 is a flowchart for illustrating a setting method of the preheat time. The flowchart of FIG. 5 is repeatedly executed by the controller 50 at a predetermined timing.

With reference to FIG. 5, the controller 50 determines, in step S51, whether or not the instant hot-water operation is carried out. The controller 50 returns the processing to a main routine when the instant hot-water operation is not carried out (determination of "NO" in S51).

On the other hand, the controller 50 stores values of the clock 501 in step S52 when the instant hot-water operation is carried out (determination of "YES" in S51). Next, the controller 50 determines, in step S53, whether the hot-water temperature Tw detected by the hot-water outlet temperature sensor 42 is equal to or higher than the predefined reference temperature T2. The controller 50 repeats step S53 when the hot-water temperature Tw is lower than the reference temperature T2 (determination of "NO" in S53).

On the other hand, the controller 50 stores the values of the clock 501 in step S54 when the hot-water temperature Tw is equal to or higher than the reference temperature T2 (determination of "YES" in S53). Next, the controller 50 calculates and stores, in step S55, a reaching time t20 in which the hot-water temperature Tw reaches the reference temperature T2 from the start of the instant hot-water operation.

Furthermore, the controller 50 reflects, in step S56, values of the reaching time t20 in the preheat time t2 and returns the processing to the main routine. As a method for reflecting the values of the reaching time t20 in the preheat time t2, for example, there is a method in which the preheat time t2 is set to an average of the values of the reaching time t20 when the instant hot-water operation is started for predefined number of times in the past.

As described above, the hot-water supply device 100 according to the embodiment automatically learns the preheat time t2 which is corresponding to the environmental conditions and the installation conditions and necessary for temperature rise of the hot-water supply path, and executes the preheat function. Therefore, the user can use hot water at an appropriate temperature as needed while avoiding unnecessary energy consumption.

Figure 6:
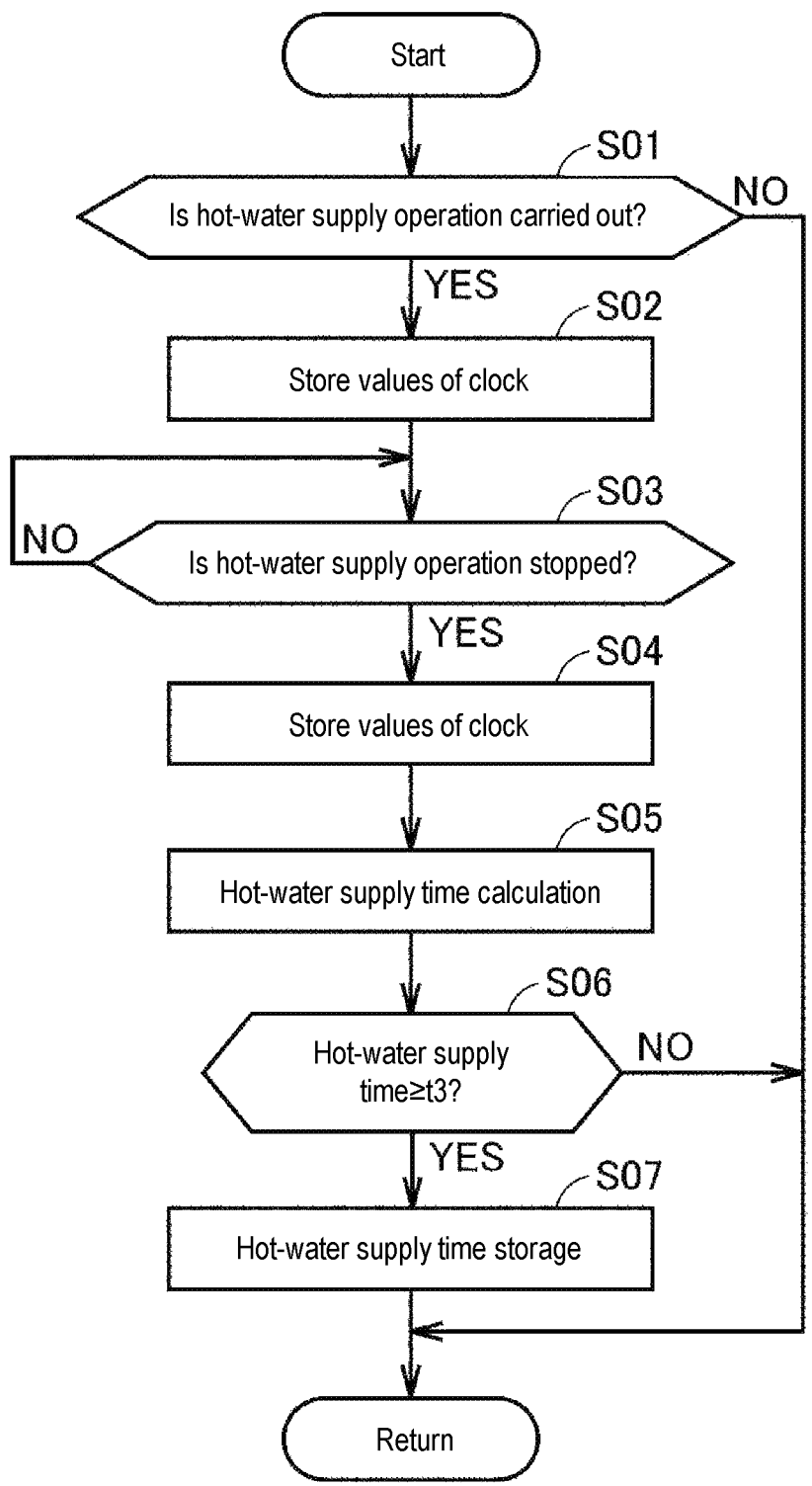
FIG. 6 is a flowchart for illustrating a storage method of a hot-water supply time.

FIG. 6 is a flowchart for illustrating a storage method of the hot-water supply time. The flowchart of FIG. 6 is repeatedly executed by the controller 50 at a predefined timing.

With reference to FIG. 6, in step S01, the controller 50 determines, based on the detection values of the water supply side flow rate sensor 43, the hot-water side flow rate sensor 28 and the circulation flow rate sensor 47, whether the hot-water supply operation is carried out. The controller 50 returns the processing to the main routine when the hot-water supply operation is not carried out (determination of "NO" in S01).

The controller 50 stores values of the clock 501 in step S02 when the hot-water supply operation is carried out (determination of "YES" in S01).

The controller 50 determines, in step S03, whether the hot-water supply operation is stopped. The controller 50 repeats step S03 when the hot-water supply operation is carried out (determination of "NO" in S03). The controller 50 stores values of the clock 501 in step S04 when the hot-water supply operation is stopped (determination of "YES" in S03).

Furthermore, the controller 50 calculates, in step S05, the time from the execution of the hot water supply operation to the stop of the hot water supply operation, that is, the hot-water supply time. Next, the controller 50 determines, in step S06, whether the hot-water supply time is equal to or greater than the determination time t3. The controller 50 returns the processing to the main routine when the hot-water supply time is less than the determination time t3 (determination of "NO" in S06).

When the hot-water supply time is equal to or greater than the determination time t3 (determination of "YES" in S06), the controller 50 stores the calculated hot-water supply times in the primary memory 502A in step S07 and returns the processing to the main routine.

As described above, the hot-water supply device 100 according to the embodiment automatically detects the hot-water supply time and stores the hot-water supply time in the primary memory 502A.

Figure 7:
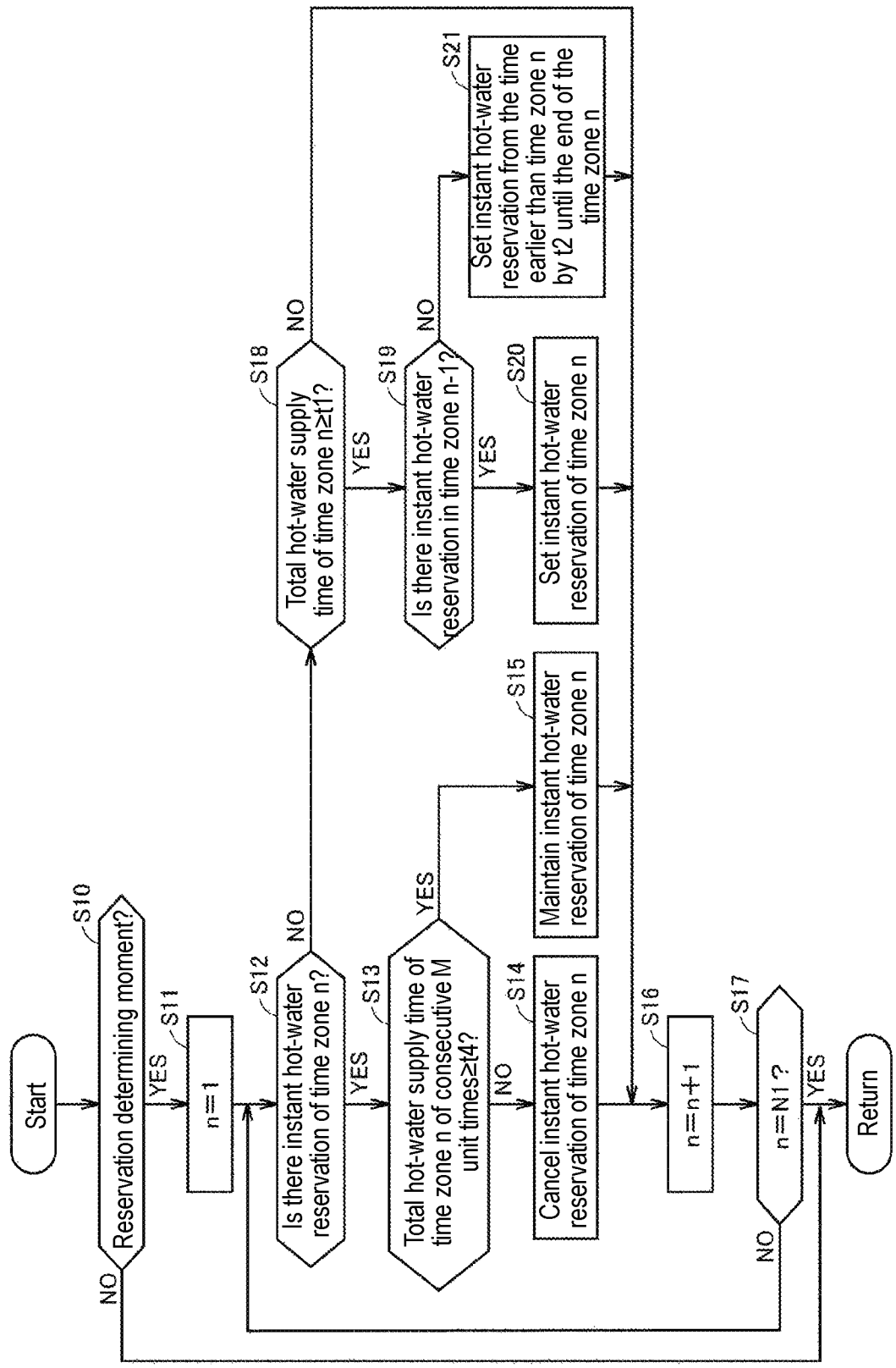
FIG. 7 is a flowchart for illustrating a reservation method of instant hot-water operation.

FIG. 7 is a flowchart for illustrating a reservation method of the instant hot-water operation. The flowchart of FIG. 7 is repeatedly executed by the controller 50 at a predefined timing.

With reference to FIG. 7, the controller 50 determines, in step S10, whether it is the predefined reservation determining moment t0 (for example, 0 a.m. every day). Furthermore, in FIG. 7, the reservation determining moment t0 is a switching moment between arbitrary consecutive first and second unit times. The controller 50 returns the processing to the main routine when it is not the reservation determining moment t0 (determination of "NO" in S10).

When it is the reservation determining moment t0 (determination of "YES" in S10), the controller 50 sets n=1 in step S11 when the number of the time zone is n (n is a natural number satisfying 1≤n≤N1). The controller 50 determines, in the following step S12, whether there is instant hot-water reservation of the time zone n in the first unit time.

When there is instant hot-water reservation of the time zone n in the first unit time (determination of "YES" in S12), in step S13, the controller 50 determines whether the total hot-water supply time of the time zone n is equal to or greater than the second reference value t4 in consecutive M (M is a natural number equal to or greater than 2) unit times (that is, M days here) before the first unit time. When the total hot-water supply time of the time zone n of the consecutive M unit times before the first unit time is less than the second reference value t4 (determination of "NO" in S13), in step S14, the controller 50 sets the reservation so as not to carry out instant hot-water operation in the time zone n of the second unit time (cancel the instant hot-water reservation).

On the other hand, when the total hot-water supply time of the time zone n is equal to or greater than the second reference value t4 in at least one of the consecutive M unit times before the first unit time (determination of "YES" in S13), in step S15, the controller 50 also maintains the instant hot-water reservation in the time zone n of the second unit time.

When there is no instant hot-water reservation in the time zone n of the first unit time (determination of "NO" in S12), in step S18, the controller 50 determines whether the total hot-water supply time of the time zone n in the first unit time is equal to or greater than the first reference value t1. The controller 50 returns the processing to the main routine when the total hot-water supply time of the time zone n in the first unit time is less than the first reference value t1 (determination of "NO" in S18).

On the other hand, when the total hot-water supply time of the time zone n in the first unit time is equal to or greater than the first reference value t1 (determination of "YES" in S18), in step S19, the controller 50 determines whether there is instant hot-water reservation in the time zone n−1 of the second unit time. When there is instant hot-water reservation in the time zone n−1 of the second unit time (determination of "YES" in S19), in step S20, the controller 50 sets the reservation so as to carry out the instant hot-water operation of the time zone n in the second unit time. On the other hand, when there is no instant hot-water reservation in the time zone n−1 of the second unit time (determination of "NO" in S19), in step S21, the controller 50 sets the reservation so as to carry out the instant hot-water operation from a moment earlier by the preheat time t2 than the time zone n in the second unit time until the end of the time zone n.

Following steps S14, S15, S20, S21, the controller 50 increases the value of n by one in step S16 (sets n=n+1). In the following step S17, the controller 50 determines whether n is equal to N1 (the number of the last time zone in each unit time) (whether n=N1). The controller 50 returns the processing to step S12 when n is not equal to N1 (n=N1 is not satisfied) (determination of "NO" in S17). On the other hand, the controller 50 returns the processing to the main routine when n is equal to N1 (n=N1) (determination of "YES" in S17).

As described above, in the hot-water supply device 100 according to the embodiment, the controller 50 reserves, on the basis of the storage in the primary memory 502A of the time zones in an arbitrary unit time in which the hot-water supply operation is carried out, the time zones of the following unit time in which instant hot-water operation is carried out.

Figure 8:
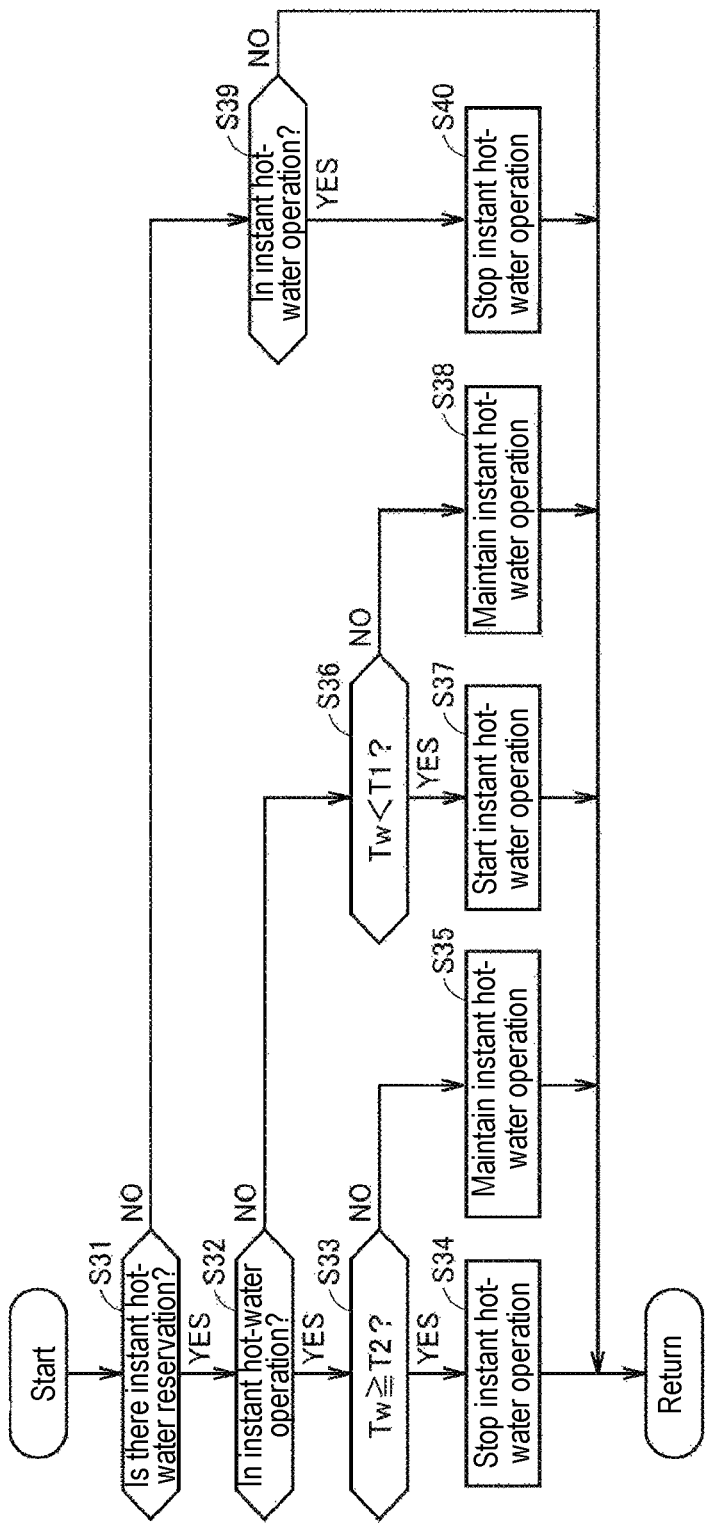
FIG. 8 is a flowchart for illustrating an execution method of the instant hot-water operation.

FIG. 8 is a flowchart for illustrating an execution method of the instant hot-water operation. The flowchart of FIG. 8 is repeatedly executed by the controller 50 at a predefined timing.

The controller 50 determines whether there is instant hot-water reservation in step S31. When there is instant hot-water reservation (determination of "YES" in S31), in step S32, the controller 50 determines whether the hot-water supply device 100 is in the instant hot-water operation. When the hot-water supply device 100 is in the instant hot-water operation (determination of "YES" in S32), in step S33, the controller 50 determines whether the hot-water temperature Tw detected by the hot-water outlet temperature sensor 42 is equal to or higher than the predefined reference temperature T2. When the hot-water temperature Tw is equal to or higher than the reference temperature T2 (determination of "YES" in S33), in step S34, the controller 50 stops the instant hot-water operation and returns the processing to the main routine.

On the other hand, when the hot-water temperature Tw is lower than the reference temperature T2 (determination of "NO" in S33), in step S35, the controller 50 maintains the instant hot-water operation and returns the processing to the main routine.

In addition, when the hot-water supply device 100 is not in the instant hot-water operation (determination of "NO" in S32), in step S36, the controller 50 determines whether the hot-water temperature Tw is lower than the predefined reference temperature T1. Here, the reference temperature T1 is a temperature equal to or lower than the reference temperature T2. When the hot-water temperature Tw is lower than the reference temperature T1 (determination of "YES" in S36), in step S37, the controller 50 starts the instant hot-water operation and returns the processing to the main routine.

On the other hand, when the hot-water temperature Tw is equal to or higher than the reference temperature T1 (determination of "NO" in S36), in step S38, the controller 50 maintains the instant hot-water operation and returns the processing to the main routine.

In addition, when there is no instant hot-water reservation (determination of "NO" in S31), in step S39, the controller 50 determines whether the hot-water supply device 100 is in the instant hot-water operation. When the hot-water supply device 100 is in the instant hot-water operation (determination of "YES" in S39), in step S40, the controller 50 stops the instant hot-water operation and returns the processing to the main routine. Furthermore, the above state without instant hot-water reservation and in the instant hot-water operation occurs immediately after the time zone n+1, for example, when there is instant hot-water reservation and instant hot-water operation is carried out in a certain time zone n (n is a natural number), but there is no instant hot-water reservation in a time zone n+1 following the time zone. At the time of this state, the controller 50 ends the instant hot-water operation following the time zone n by step S31, steps S39 and S40.

On the other hand, the controller 50 returns the processing to the main routine when the hot-water supply device 100 is not in the instant hot-water operation (determination of "NO" in S39).

As described above, the hot-water supply device 100 according to the embodiment controls the instant hot-water operation based on the instant hot-water reservation.

Other Configuration Examples (1) About Unit Times

Figure 9:
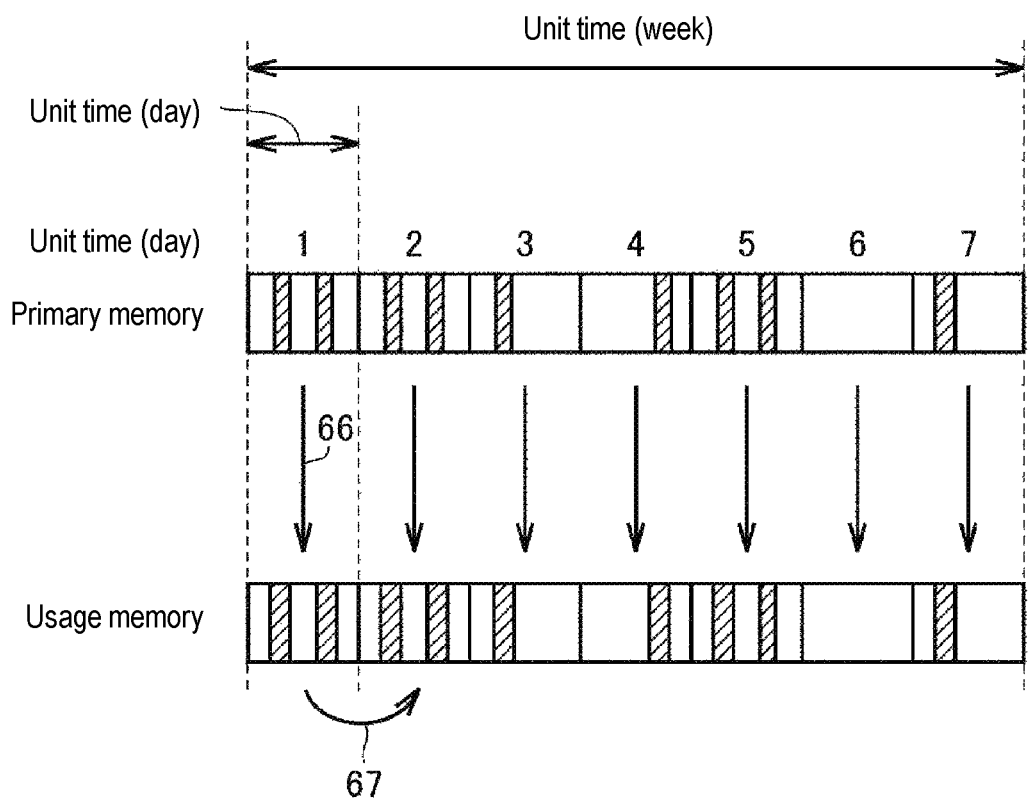
FIG. 9 is a diagram for illustrating hot-water supply storage and instant hot-water reservation in unit times (weeks).

FIG. 9 is a diagram illustrating hot-water supply storage and instant hot-water reservation in unit times (weeks). As described above, the unit times are times in which the pattern of the hot-water usage of the user makes a round, and the time unit of one week is shown in the example of FIG. 9. With reference to FIG. 9, the unit times (weeks) are configured by seven unit times (days). In addition, the hot-water supply time of each time zone is stored in the primary memory 502A for each unit time (day). Based on the storage of the time zones in which the hot-water supply operation is carried out for each unit time (day), reservation of time zones of instant hot-water operation in the next week is stored in the usage memory 502B for each unit time (day). That is, the instant hot-water operation is reserved for every day of the week so that, for example, usage time zones of hot-water supply on Monday of this week are reserved for instant hot-water at the same time zones on Monday of the next week (see arrow 66).

At the time of factory shipment, there is no data indicating time zones of the hot-water supply operation until now in the primary memory 502A, and thus the time zones of the reservation of the instant hot-water operation cannot be stored in the usage memory 502B based on the data. Therefore, as described above, in the usage memory 502B at the time of factory shipment, instant hot-water reservation with a pre-set pattern or a 24-hour-on instant hot-water reservation may be set. In addition, there is a case in which it is considered that compared with the pre-set pattern or 24-hour-on pattern, an instant hot-water pattern of the same day in the next week based on a hot-water usage pattern on the first day of the user is more consistent with the hot-water usage on the second day of the user (that is, a case in which it is considered that with respect to the hot-water usage pattern, the usage on the first day and the usage on the second day are more consistent compared with the usage on the first day and the pre-set instant hot-water reserve pattern). In this case, the instant hot-water reserve pattern of the second day may be configured by copying the instant hot-water pattern of the same day of the next week based on the hot-water usage pattern on the first day (see an arrow 67).

(2) About Synchronization of Clocks

Figure 10:
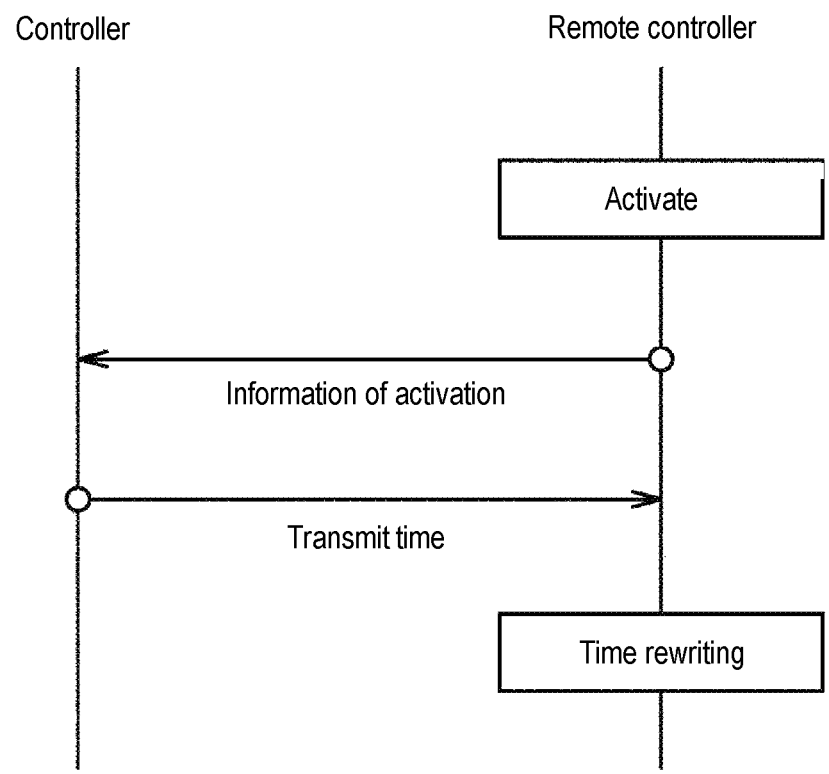
FIG. 10 is a sequence diagram for illustrating synchronization of a clock of a remote controller with a clock of a controller.

FIG. 10 is a sequence diagram for illustrating synchronization of a clock of a remote controller with a clock of a controller. With reference to FIG. 10, when the remote controller 8 is activated, a signal indicating the activation is transmitted to the controller 50. When receiving the signal, the controller 50 transmits the time of the clock 501 to the remote controller 8 via the communication line 80. When receiving the time of the clock 501, the remote controller 8 rewrites the time of the clock 871 with the time of the clock 501. That is, the remote controller 8 can synchronize the time of the clock 871 with the received time of the clock 501.

In this way, the user does not need to manually set the time of the clock 871, and usage of the remote controller becomes easier.

As described above, in the hot-water supply device according to the embodiment of the disclosure, the usage of the hot-water supply of the user during the instant hot-water operation and during stopping of the instant hot-water operation can be detected by the controller and automatically reflected in the reservation of the instant hot-water operation. That is, the hot-water supply device which achieves both energy saving and user comfort can be provided by automatically reserving so that the instant hot-water operation is carried out in the time zones in which the hot-water supply is used in the past.

The embodiment disclosed here should be considered as illustrative instead of restrictive in all points. The scope of the disclosure is not shown by the above description but by the scope of claims and is intended to include the meaning equivalent to the scope of the claims and all changes within the scope.

What is claimed is:

1. A hot-water supply device, comprising:
a hot-water dispenser for supplying hot-water;
a hot-water supply path for carrying out hot-water supply operation which supplies the hot-water from the hot-water dispenser to a hot-water supply tap;
a circulation path for carrying out instant hot-water operation which circulates and heats the hot-water remaining in the hot-water supply path;
a processor which controls the hot-water supply operation and the instant hot-water operation of the hot-water dispenser;
a first clock which repeatedly measures unit times which are times in which a pattern of hot-water usage of a user makes a round; and
a flow rate sensor which detects the supply of the hot-water from the hot-water supply tap; wherein
the processor is configured to detect, for each of the unit times and based on detection signals of the flow rate sensor, a time zone in which the hot-water supply operation is carried out; and
the processor is further configured to reserve, based on a time zone which is detected in a first unit time and in which the hot-water supply operation is carried out, a time zone in a second unit time following the first unit time in which the instant hot-water operation is carried out, and carry out the instant hot-water operation based on the reservation in the second unit time, wherein the processor determines whether it is a predefined reservation determining moment, wherein the predefined reservation determining moment is a switching moment between the first unit time and the second unit time;
determines whether there is instant hot-water reservation of a time zone n in the first unit time when it is the reservation determining moment, wherein n is a number of the time zone;
determines whether a total hot-water supply time of the time zone n is equal to or greater than a second reference value in each unit time among consecutive M unit times before the first unit time when there is instant hot-water reservation of the time zone n in the first unit time, wherein M is a natural number equal to or greater than 2;
sets the reservation so as not to carry out the instant hot-water operation in the time zone n of the second unit time when the total hot-water supply time of the time zone n of each unit time among the consecutive M unit times before the first unit time is less than the second reference value;
maintains the instant hot-water reservation in the time zone n of the second unit time when the total hot-water supply time of the time zone n is equal to or greater than the second reference value in at least one of the consecutive M unit times before the first unit time;
determines whether the total hot-water supply of the time zone n in the first unit time is equal to or greater than a first reference value when there is no instant hot-water reservation in the time zone n of the first unit time;
determines whether there is instant hot-water reservation in a time zone n−1 of the second unit time when the total hot-water supply time of the time zone n in the first unit time is equal to or greater than the first reference value;
sets the reservation so as to carry out the instant hot-water operation of the time zone n in the second unit time when there is instant hot-water reservation in the time zone n−1 of the second unit time
sets the reservation so as to carry out the instant hot-water operation from a moment earlier by a preheat time than the time zone n in the second unit time until an end of the time zone n when there is no instant hot-water reservation in the time zone n−1 of the second unit time.

2. The hot-water supply device according to claim 1, wherein the hot-water supply device further comprises a remote controller for remotely operating the hot-water dispenser, wherein
the remote controller comprises a second clock for measuring a current time, and
the remote controller synchronizes a time of the second clock with a received time of the first clock.

* * * * *